US008871352B2

(12) United States Patent
Joslin et al.

(10) Patent No.: US 8,871,352 B2
(45) Date of Patent: *Oct. 28, 2014

(54) DENDRITIC OXYGEN SCAVENGING POLYMER

(71) Applicant: Valspar Sourcing, Inc., Minneapolis, MN (US)

(72) Inventors: Richard D. Joslin, Moon Township, PA (US); Jeffrey Niederst, Leechburg, PA (US); Paul E. Share, Ann Arbor, MI (US); Grant Schutte, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,259

(22) Filed: May 31, 2013

(65) Prior Publication Data

US 2013/0264516 A1  Oct. 10, 2013

Related U.S. Application Data

(63) Continuation of application No. 12/674,757, filed as application No. PCT/US2008/073839 on Aug. 21, 2008, now Pat. No. 8,476,400.

(60) Provisional application No. 60/968,201, filed on Aug. 27, 2007.

(51) Int. Cl.
*B32B 27/00* (2006.01)
*C08G 83/00* (2006.01)
*C08K 3/00* (2006.01)
*C08L 101/00* (2006.01)
*C08K 5/098* (2006.01)
*B65D 81/26* (2006.01)
*C08L 67/02* (2006.01)
*C08L 71/02* (2006.01)

(52) U.S. Cl.
CPC ............ *B65D 81/266* (2013.01); *C08G 83/003* (2013.01); *C08K 3/0016* (2013.01); *C08L 71/02* (2013.01); *C08L 101/005* (2013.01); *C08K 5/098* (2013.01); *C08L 67/02* (2013.01)
USPC ........ 428/480; 528/271; 528/280; 528/308.1; 252/188.28

(58) Field of Classification Search
CPC .. B65D 81/266; C08G 83/003; C08K 3/0016; C08K 5/098; C08L 71/02; C08L 101/005; C08L 67/02
USPC ...................... 528/271, 272, 277, 280, 308.1; 428/36.92, 480; 252/188.28; 425/133.5; 524/440
See application file for complete search history.

(56) References Cited

U.S. PATENT DOCUMENTS 4,908,151 A  3/1990  Inoue et al.
5,310,497 A  5/1994  Ve Speer et al.

(Continued)

FOREIGN PATENT DOCUMENTS

JP  2001040226     2/2001
JP  2008523217 A   7/2008
WO  2006125965     11/2006

OTHER PUBLICATIONS

Japanese Official Action dated Jan. 15, 2014 for corresponding Japanese Patent Application No. 2010-523044 (4 pages).

(Continued)

*Primary Examiner* — Frances Tischler
(74) *Attorney, Agent, or Firm* — Brian R. Morrison; Westman, Champlin & Koehler, P.A.

(57) ABSTRACT

An oxygen-scavenging composition is provided that includes an oxygen-scavenging polymer and a catalyst. The oxygen-scavenging polymer, which in preferred embodiments is suitable for use in packaging articles, is a dendritic polymer having one or more oxygen-scavenging groups.

23 Claims, 1 Drawing Sheet

Dendrimer

Linear-dendritic hybrid

Dendronized polymer or Dendrigrafted polymer

Hyperbranched polymer

Multi-arm star polymer

Hypergrafted polymer

(56) References Cited

U.S. PATENT DOCUMENTS

| | | |
|---|---|---|
| 5,418,301 A | 5/1995 | Hult et al. |
| 5,514,764 A | 5/1996 | Frechet et al. |
| 5,587,446 A | 12/1996 | Frechet et al. |
| 5,639,815 A | 6/1997 | Cochran et al. |
| 5,663,260 A | 9/1997 | Frechet et al. |
| 5,700,554 A | 12/1997 | Speer et al. |
| 6,020,457 A | 2/2000 | Klimash et al. |
| 6,114,489 A | 9/2000 | Vicari et al. |
| 6,225,404 B1 | 5/2001 | Sorensen et al. |
| 6,525,170 B1 | 2/2003 | Wang |
| 6,617,418 B1 | 9/2003 | Magnusson et al. |
| 6,673,870 B2 | 1/2004 | Owens et al. |
| 6,733,851 B2 | 5/2004 | Ferri |
| 6,933,055 B2 | 8/2005 | Share et al. |
| 7,091,308 B2 | 8/2006 | Haggman et al. |
| 7,097,890 B1 | 8/2006 | Ching et al. |
| 7,166,657 B2 | 1/2007 | Rao et al. |
| 2002/0153511 A1 | 10/2002 | Cotterman et al. |
| 2003/0212173 A1 | 11/2003 | Owens et al. |
| 2006/0014848 A1 | 1/2006 | Loccufier et al. |
| 2006/0052510 A1 | 3/2006 | Haggman et al. |
| 2006/0099232 A1 | 5/2006 | Matsunami |
| 2006/0122306 A1 | 6/2006 | Stafford et al. |
| 2006/0148957 A1 | 7/2006 | Stewart et al. |
| 2006/0202161 A1 | 9/2006 | Share et al. |
| 2006/0211811 A1 | 9/2006 | Goto et al. |
| 2006/0233730 A1 | 10/2006 | Mougin |
| 2006/0241194 A1 | 10/2006 | Cha et al. |
| 2007/0014754 A1 | 1/2007 | Denkewicz, Jr. et al. |
| 2007/0027269 A1 | 2/2007 | Stumbe et al. |
| 2008/0180803 A1* | 7/2008 | Seybert et al. ............ 359/642 |

OTHER PUBLICATIONS

Perstorp brochure on BOLTORN.RTM. Dendritic Polymers, published prior to Aug. 27, 2007 (11 pages).

Lange, J., et al., Barrier Coatings for Flexible Packaging based on Hyperbranched Resins, Polymer 42 (2001) 7403-7410, published by Elsevier Science Ltd. in 2001 (8 pages).

* cited by examiner

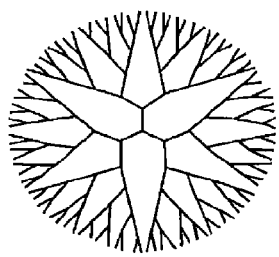
Dendrimer
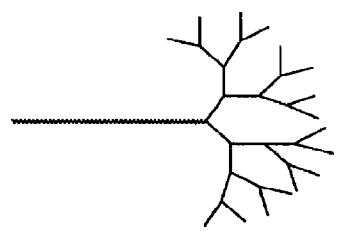
Linear-dendritic hybrid
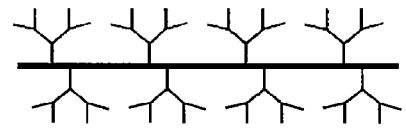
Dendronized polymer or Dendrigrafted polymer
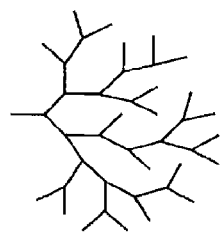
Hyperbranched polymer
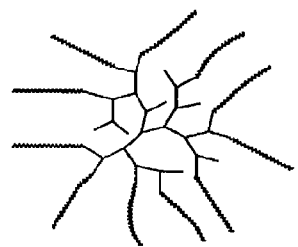
Multi-arm star polymer
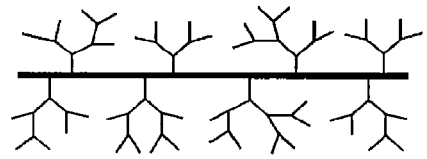
Hypergrafted polymer

DENDRITIC OXYGEN SCAVENGING POLYMER

CROSS-REFERENCE TO RELATED APPLICATION(S)

This application is a continuation of U.S. application Ser. No. 12/674,757, filed on Feb. 23, 2010, which is a National Stage Filing under 35 U.SC. §371 of International Patent Application No. PCT/US2008/073839, filed on Aug. 21, 2008, which claims priority to U.S. Provisional Application No. 60/968,201, filed on Aug. 27, 2007, the disclosures of which are incorporated by reference in their entirety.

TECHNICAL FIELD

This invention relates to oxygen scavenging materials. More specifically, the present invention relates to oxygen scavenging materials suitable for use in packaging articles.

BACKGROUND

Historically, oxygen-sensitive products have been packaged and shipped in either glass or metal containers for delivery to the consumer. These containers have essentially zero gas permeability and, as such, the oxygen-sensitive products are able to remain fresh for an extended period of time.

There is a growing desire to package certain products such as, for example, food and beverage products, in various plastic (e.g., PET, HDPE, PP, etc.) containers, wrapping, and other packaging articles. Compared to glass or metal packaging, plastic packaging is typically cheaper, more resistant to breakage, and more flexible (if desired). Conventional plastics, however, have generally functioned poorly at blocking oxygen passage relative to other available materials, such as glass or metal. The permeability of conventional plastics to oxygen transmission can result in short product shelf life, especially for products that are sensitive to degradation when exposed to oxygen.

To reduce gas transmission of a plastic packaging material, a passive barrier may be used to hinder the passage of a gas, e.g., oxygen. For example, in a multi-layer bottle, the inner and outer layers may be made of PET, while the center layer is a different material with passive barrier properties such as, for example, ethylene vinyl alcohol (EVOH). However, layers of dissimilar materials often do not adhere well to one another, and an adhesive between the layers may be required to prevent delamination. The clarity of the packaging material may be reduced when a passive barrier material is used, and the multi-layered material may be more difficult to recycle.

Oxygen-scavenging materials, which reduce or deplete the oxygen in an environment, have been incorporated into plastic containers in an attempt to maintain a low level of oxygen within the container, thereby extending the shelf life of the product. These plastic containers, however, have typically suffered from one or more deficiencies such as loss of adhesion, delamination, presence of off tastes or odors in products packaged therein, poor clarity, unsuitable cost (e.g., material, storage, and/or transportation costs), insufficient oxygen-scavenging capacity and/or shelf life, and inefficient or untimely activation of oxygen scavenging. Due to such deficiencies, for example, glass still predominates over plastics in juice and beer bottling.

What is needed in the marketplace is an improved oxygen-scavenging polymer for use in articles such as packaging, wrapping and storage articles.

SUMMARY

In one aspect, the invention is an oxygen-scavenging polymer suitable for use in a variety of applications, including packaging applications. The polymer is preferably a dendritic polymer having at least one, and more preferably a plurality of, oxygen-scavenging groups ("OS groups").

In another aspect, the invention is an oxygen-scavenging polymer composition including the oxygen-scavenging polymer and an oxidation catalyst.

In yet another aspect, the invention is a solution or a dispersion including the oxygen-scavenging polymer and/or composition and a suitable solvent. The solution or dispersion may be applied, for example, as a coating for packaging articles.

In yet another aspect, the invention is a packaging material including the oxygen-scavenging polymer and/or composition. The packaging material may include the oxygen-scavenging polymer and/or composition as a blend with other polymers in a single layer package such as a bottle or a film. Alternatively, the oxygen-scavenging polymer and/or composition may be used alone or as a blend with other polymers in one or more layers in a multi-layered package such as a bottle or a film.

In yet another aspect, the invention is a method for making the oxygen-scavenging compositions described herein.

The above summary of the invention is not intended to describe each disclosed embodiment or every implementation of the invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is a schematic illustration of various non-limiting examples of dendritic polymers.

SELECTED DEFINITIONS

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms.

The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.).

A group that may be the same or different is referred to as being "independently" something. Substitution is anticipated on the organic groups of the compounds of the invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "repeat unit" refers to a structurally repeating unit of a polymer. A repeat unit may be a monomeric unit or an oligomeric unit (i.e., includes two or more monomeric units).

The term "branch repeat unit" refers to a repeat unit that has a valence of three or more and is covalently attached to, or capable of covalently attaching to, three or more repeat units. Thus, for example, a styrene repeat unit in a polystyrene polymer does not constitute a branch repeat unit.

The term "branched repeat unit" refers to a branch repeat unit of a polymer that is covalently attached to at least three repeat units. Thus, for example, a terminal branch repeat unit is not a branched repeat unit.

The term "backbone" refers to a longest chain of a polymer. Thus, for example, while some dendritic polymers (e.g., dendrimers) are not typically considered to have a backbone in a conventional sense, as used herein, the backbone of a dendritic polymer is its longest chain. When a repeat unit is referred to as being "located away" from the backbone, this indicates that the repeat unit is not located within the backbone.

The term "oligomer" refers to a structure that contains a relatively small number of monomeric units. As used herein, the term includes any structure having two or more monomeric units, wherein the structure does not include a sufficient number of monomeric units to be properly considered a polymer.

The term "oxygen scavenging" means absorbing, consuming, or reducing the amount of oxygen from a given environment.

The term "packaging article" as used herein includes both packaging articles in a final commercial form, as well as any intermediate stages. Preforms, which are frequently formed for plastic containers and other packaging articles, are one example of such an intermediate stage.

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

As used herein, the term "carbon-carbon double bond" means a double bond between two carbon atoms, but excludes the double bonds of an aromatic ring.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims.

As used herein, "a," "an," "the," "at least one," and :one or more" are used interchangeably. Thus, for example, a coating composition that comprises "an" amine can be interpreted to mean that the coating composition includes "one or more" amines.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges (e.g., 1 to 5 discloses 1 to 4, 1.5 to 4.5, 1 to 2, etc.) included within the broader range.

DETAILED DESCRIPTION

In one aspect, the invention provides an oxygen-scavenging polymer in the form of a dendritic polymer. The dendritic polymer preferably includes one or more OS groups and may be used neat as an oxygen-scavenging composition or combined with one or more additional materials such as, for example, an oxidation catalyst and/or another polymer material.

As used herein, the term "dendritic polymer" refers to a broad class of branched macromolecular structures that typically exhibit a globular morphology. FIG. 1 provides some examples of different types of dendritic polymers, namely— dendrimers, linear/dendritic hybrids, dendronized polymers or dendrigrafted polymers, hyperbranched polymers, multi-arm star polymers, and hypergrafted polymers. As illustrated in FIG. 1, dendritic polymers typically have branches extending from other branches, like a tree, rather than linear branches extending from a well-defined backbone segment. Moreover, in contrast to conventional linear or branched linear polymers (e.g., comb polymer or brush polymers), dendritic polymers are typically characterized by a relatively high level of branching.

While not intending to be bound by theory, dendritic polymers may have several desirable features compared to linear or branched linear polymer analogs.

For example, the intrinsic viscosity of dendritic polymers is typically lower than that of linear or branched linear polymer analogs of a similar molecular weight. Thus, for example, dendritic polymers may be particularly useful in food-contact packaging coatings or compositions where higher molecular weight polymers are generally desired to minimize or eliminate migration of the polymers out of the coatings. As such, the use of dendritic polymers in such applications may allow for higher molecular weights and/or higher solids levels to be achieved without unsuitably raising the viscosity of the coating or composition.

In addition, any functional groups that are located at or near terminal ends of the dendritic polymer may be more likely to be present on, or near, the surface of the polymer as compared to a linear or branched linear polymer analog of a similar molecular weight and similar number of functional groups. Such a configuration may enhance the accessibility of the functional groups for participating in reactions. Moreover, due to the high degree of branching, it may be possible to incorporate a greater number of functional groups into a dendritic polymer as compared to a linear polymer analog of a similar molecular weight.

As discussed above, dendritic polymers are typically characterized by a relatively high amount of branching. One useful measure for assessing the amount of branching present in a polymer is the degree of branching. As used herein, the term "degree of branching" refers to the ratio of (a) the total number of branch repeat units included in a polymer to (b) the total number of repeat units included in the polymer. Dendritic polymers having any suitable degree of branching may be employed in compositions of the invention. In certain preferred embodiments, the dendritic polymer (or one or more dendritic polymer portions thereof) exhibits a degree of branching of at least about 0.2, more preferably at least about 0.4, and even more preferably at least about 0.7.

Care should generally be exercised in interpreting degree of branching information for dendritic polymers. For example, certain dendritic polymers of the invention may exhibit a degree of branching of less than about 0.2, yet include one or more dendritic polymer portions (or subunits) that exhibit a degree of branching of greater than about 0.2, more preferably greater than about 0.4, or even more preferably greater than about 0.7. This may be the case, for example, when a highly branched dendritic polymer core is chain extended using long chains of linear repeat units. If sufficiently chain extended, the overall degree of branching for such a polymer may be less than about 0.2.

The presence of branched repeat units located away from the backbone contributes to the tree-like branching pattern characteristic of dendritic polymers. Dendritic polymers of the invention may have any suitable number of branched repeat units located away from the backbone. Preferably, the dendritic polymers include at least 1, and more preferably a plurality (e.g., 2, 3, 4, 5, 6, 7, 8, 9, 10 or more, and so on) of, branched repeat units located away from the backbone.

Compositions of the invention may include any suitable dendritic polymer, or combination of dendritic polymers.

As mentioned above, in some embodiments, the dendritic polymers may be a dendrimer or a mixture of a dendrimer and one or more other types of dendritic polymers. Some dendrimers are highly branched globular polymers and may, in certain embodiments, have a highly symmetrical structure with successive radial layers of repeating units (often referred to as "generations"). "True" dendrimers (also referred to as "mathematical" dendrimers) have an exactly defined and reproducible structure (i.e., all molecules have the same molecular weight and structure). True dendrimers have a degree of branching equal to 1. For purposes of this invention, a "true dendrimer" will encompass the aforementioned molecules, as well as any molecules that have a similar (though not as exactly defined and reproducible) overall structure and a degree of branching of 0.7 or greater.

Likewise, as discussed above, in some embodiments, the dendritic polymers may be hyperbranched polymers. Similar to dendrimers, hyperbranched polymers are highly branched polymers that typically exhibit a globular structure. Unlike dendrimers, however, hyperbranched polymers typically exhibit substantial irregularity in terms of branching pattern and structure, which typically results in substantial variation in molecular weight (often referred to as polydispersity). Hyperbranched polymers typically can be prepared more cost effectively than dendrimers and, as such, are presently preferred.

Any suitable type of dendritic polymer may be employed in the present invention. Examples of suitable dendritic polymers may include polyamides, polyesters, polyethers, polyolefins (e.g., polyethylene, polypropylene, polybutadiene, etc.), vinylic polymers, polyimines, polysiloxanes, polyurethanes, polythioethers, polyarylalkylenes, polysilanes, polycarbonates, polysulfones, polyimides, polyesterimides, polyesteramides, and the like, or copoloymer or combinations thereof. In some embodiments, the dendritic polymers may be a segment of a copolymer.

Examples of suitable commercial dendritic polymers include suitable members of the BOLTORN line of products (commercially available from Perstorp) such as, for example, the U3000 and W3000 products; the HYBRANE line of products (commercially available from DSM); and the PRIOSTAR and STARBURST line of products (both commercially available from Dendritic Nanotechnologies, Inc.).

In a presently preferred embodiment, the dendritic polymer is a polyester. Examples of suitable polyesters include polyethylene terephthalate ("PET"), polybutylene terephthalate ("PBT"), polyethylene naphthalate ("PEN"), polybutylene naphthalate, and derivatives and mixtures thereof. Examples of suitable commercial dendritic polyester polymers include the BOLTORN U3000 and W3000 products.

Dendritic polymers of any suitable molecular weight may be employed in the invention to achieve the desired result. As discussed above, the architecture of dendritic polymers typically enables a higher molecular weight to be achieved compared to conventional non-dendritic structures, while still exhibiting a suitable viscosity. In preferred embodiments, the dendritic polymers have a number average molecular weight ($M_n$) of at least about 1,000, more preferably at least about 1,500, and even more preferably at least about 2,000. Preferably, the dendritic polymers exhibit a $M_n$ of less than about 100,000, more preferably less than about 50,000, and even more preferably less than about 10,000.

Dendritic polymers of the invention preferably include one or more OS group. The oxygen-scavenging group(s) is typically an oxidizable group capable of scavenging oxygen. To achieve the desired oxygen-scavenging properties, a sufficient number of OS groups should preferably be present in the dendritic polymer and/or composition to achieve a suitable level of oxygen-scavenging for a suitable length of time.

Dendritic polymers of the invention preferably exhibit a high degree of OS group functionality. In certain embodiments, the dendritic polymers may include, for example, 2 or more OS groups, 5 or more OS groups, 10 or more OS groups, 20 or more OS groups, or 100 or more OS groups. In certain embodiments, dendritic polymers having unsaturated OS groups, exhibit theoretical iodine numbers of preferably between about 10 and about 200, more preferably between about 20 and about 175, and even more preferably between about 30 and about 150 milligrams of iodine per 100 grams of dendritic polymer. For dendritic polymers containing other OS functional groups, the reactive functionality may be present at comparable levels, in some embodiments.

Any suitable group capable of scavenging oxygen may be employed at any suitable location within the dendritic polymer. Preferably, at least one, and more preferably a plurality, of OS groups are located at or near terminal locations of the dendritic polymer. In some preferred embodiments, (i) at least a majority or (ii) all of the OS groups are located at terminal ends of the dendritic polymer. For example, this may occur when a preformed dendritic polymer containing one or more terminal reactive groups is modified to include terminal OS groups. While not intending to be bound by any theory, OS groups located in terminal groups may be more exposed and available for oxygen scavenging as compared to OS groups located within the interior of the polymer structure, which may, for example, enhance oxygen scavenging kinetics and/or capacity. If desired, however, some or all of the OS groups may be located at interior or non-terminal locations of the dendritic polymer.

The OS groups can be attached to one or more other portions of the dendritic polymer via one or more suitable linking groups. Examples of suitable linking groups include amide, ester (including, e.g., carbonate esters (—O—C(=O)—O—)), ether, urea, urethane, thiol, substituted or unsubstituted hydrocarbon linking groups, and variations and combinations thereof. Ester and amide linkages are presently preferred.

Examples of suitable OS groups include unsaturated organic groups (which preferably include at least one non-aromatic carbon-carbon double bond), polyamide groups (e.g., groups formed via polymerization of adipic acid and metaxylene diamine), any other suitable OS group, and combinations thereof.

Unsaturated organic groups that contain one or more reactive carbon-carbon double bonds are presently preferred OS groups. While not intending to be bound by any theory, it is believed that the active oxygen-scavenging ability of dendritic polymers of the invention that include unsaturated organic groups is based on the one or more carbon-carbon double bonds, which are exposed and available for oxidation. In such embodiments, the number of carbon-carbon double bonds is believed to be an important factor in determining the oxygen scavenging capacity. As such, a sufficient number of carbon-carbon double bonds should preferably be present in order for compositions containing the dendritic polymers to perform adequately, and for a suitable length of time.

Polyunsaturated groups are preferred unsaturated OS groups, although monounsaturated or combinations of monounsaturated and polyunsaturated groups may be employed if desired. In preferred embodiments, the dendritic polymer includes (i) two or more carbon-carbon double bonds that are conjugated and/or (ii) one or more single or double allylic hydrogen. While not intending to be bound by any theory, the presence of the above features (i) or (ii) may, in some embodiments, enhance one or more oxygen-scavenging properties of the dendritic polymers.

Examples of suitable commercially available dendritic polymers having unsaturated OS groups include the BOLTORN U3000 and W3000 materials (Perstrop).

In one embodiment, the dendritic polymer has at least one structural unit represented by schematic formula (I):

—X—Y—Z

In schematic formula I,

X depicts a divalent organic linking group that links the —Y—Z group to another portion of the dendritic polymer;

Y depicts a divalent oxygen-scavenging group; and

Z depicts hydrogen or a monovalent organic group.

In formula I, suitable X linking groups include ester (including, e.g., carbonate ester (—O—C(=O)—O—)), amide, urethane, ether, urea, substituted or unsubstituted hydrocarbon (e.g., alkyl) linking groups, or any other suitable linking group. Ester and amide linking groups are presently preferred. Suitable Y OS groups include conjugated and non-conjugated alkenyl groups, more preferably alkenyl groups having two or more carbon-carbon double bonds. If desired, the alkenyl group may be linear or branched, with the carbon-carbon double bonds being on either the backbone of the Y group, or on a branch of the Y group, or both.

In another preferred embodiment of formula I, the Y group comprises the formula —W—C($R_3$)=C($R_4$)—C($R_5R_6$)—C($R_7$)=C($R_8$)—, wherein W, if present, is a divalent organic group. In another preferred embodiment, the Y group comprises the formula —W—C($R_3$)=C($R_4$)—C($R_7$)=C($R_8$)—, wherein W, if present, is a divalent organic group.

In the above embodiments, the R groups (i.e., $R_3$ to $R_8$) preferably each denote one of a hydrogen atom, a substituted or unsubstituted alkyl group, a substituted or unsubstituted cycloalkyl group, a substituted or unsubstituted aryl group, or a substituted or unsubstituted alkenyl group. Each R group preferably has less than 20 carbon atoms, more preferably less than 10 carbon atoms, and most preferably will denote a hydrogen atom.

In certain preferred embodiments of formula I, the —X—Y—Z structure, or a portion thereof, is formed using as a feedstock of one or more mono- or polyunsaturated fatty acid molecules, preferably one or more polyunsaturated fatty acids. Suitable fatty acids include mono-unsaturated fatty acids such as arichidonic, erucic, oleic, palmitoleic, and ricinoleic acid; and polyunsaturated fatty acids such as licanic, linolenic, eleostearic, linoleic, and conjugated linoleic acid. Preferred fatty acids include licanic, linolenic, eleostearic, linoleic, and conjugated linoleic acid. If desired, combinations of these fatty acids, combinations of these fatty acids together with saturated fatty acids, and the like may be used.

An advantage of using a fatty acid-based feedstock is their relatively low cost. Other useful fatty acids may include mixtures of saturated and unsaturated fatty acids such as, for example, fatty acids from natural or modified oils such as linseed oil, soybean oil, sunflower oil, safflower oil, castor oil, tung oil, oiticica oil, fish oil, tall oil, cotton seed oil, and mixtures thereof.

For further discussion of OS groups formed from unsaturated fatty acids or other unsaturated components, see pending U.S. patent applications 60/968,208 and 60/968,218 by Evans et al. entitled Oxygen Scavenging Composition and filed on Aug. 27, 2007.

In some embodiments, one or more OS groups may be an unsaturated cyclic group such as, for example, the monounsaturated cyclic groups of U.S. Pat. No. 7,097,890 by Ching et al.

In some embodiments, one or more OS groups may be provided by a butadiene or polybutadiene compound, such as, for example, a polybutadiene diol.

In some embodiments, one or more OS groups may be incorporated through use of compounds including succinic anhydride derivatives (e.g., octenyl succinic anhydride) such as, for example, those taught in U.S. Application No. 20060202161 by Share et al.

Unsaturated OS groups may also be employed that have one or more carbon-carbon double bonds modified with a cyclopentadiene compound. For example, a conjugated diene compound (e.g., a cyclopentadiene compound) may be reacted with a carbon-carbon double bond via a Diels-Alder reaction to form a strained group (e.g., a norbornene group) capable of scavenging oxygen. For further discussion, see, for example, U.S. Provisional Application 60/910,866 by Share et al. and International Application No. PCT/US2008/059562 by Share et al.

In some embodiments, one or more OS groups may be in the form of an unsaturated bicyclic group. In one such embodiment, the OS group includes a bicyclic structure represented by the IUPAC (International Union of Pure and Applied Chemistry) nomenclature Expression (I):

bicyclo[x.y.z]alkene

In Expression (I):
x is an integer having a value of 2 or more,
y and z are each an integer having a value of 1 or more, and
the term alkene refers to the IUPAC nomenclature designation (e.g., hexene, heptene, heptadiene, octene, etc.) for a given bicyclic molecule.
In preferred embodiments, x has a value of 2 or 3 (more preferably 2) and each of y and z independently have a value of 1 or 2.

Examples of some suitable OS groups represented by Expression (I) include bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene.

It is contemplated that the OS groups represented by Expression (I) may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic OS group) or acyclic groups may be attached to the bicyclic group represent by Expression (I).

Dendritic polymers of the invention can be made using any suitable process and starting materials. Processes and materials for forming dendritic polymers are well known in the art. See, for example, Gao et al. "Hyperbranched polymers: from synthesis to applications." *Prog. Polym. Sci.* 29 (2004): 183-275; U.S. Pat. Nos. 5,418,301, 6,225,404, 6,525,170, 6,617,418, 7,091,308; and U.S. Pat. App. Nos. 2006/0233730, 2006/0052510, and 2007/0027269. Polyaddition, polycondensation, and combinations of polyaddition and polycondensation polymerization processes can be employed to produce suitable dendritic polymers. In general, dendrimers are made using multiple-step processes and hyperbranched polymers are made using one-step (or "one-pot") polymerization processes. Non-limiting examples of some suitable processes are provided below.

Hyperbranched polymers are often produced through polymerization of reactants that include an $A_m$-L-$B_n$ compound, wherein:
A and B are reactive functional groups capable of reacting with one another;
m is an integer of 1 or more, and is preferably 1;
n is an integer of 2 or more, and is preferably 2 or 3; and
L is any suitable linking group between A and B.

Such $A_m$-L-$B_n$ compounds are typically employed to incorporate branch repeat units. The compounds may be used alone, or may be combined with one or more other reactants, to form a dendritic polymer.

For purposes of the present invention, A, B, and L may be any suitable groups. For example, L may be carbon; nitrogen or a nitrogen-containing group; silicon or a silicon-containing group; a substituted or unsubstituted alkyl, alkenyl, or alkynyl group; a substituted or unsubstituted cycloalkyl, cycloalkenyl, or cycloalkynyl group; a substituted or unsubstituted aryl group; or a combination thereof. Examples of suitable A and B reactive functional groups may include amine, carboxylic, hydroxyl, isocyanate, sulphonic acid, thiol, unsaturated groups and the like, and combinations thereof, where A and B are different reactive groups capable of reacting with the other type of reactive group to form a covalent linkage. For example, A may be a carboxylic group and B may be a hydroxyl group.

So called "$A_2+B_3$" polymerization approaches may also be employed in which, for example, di- and tri-functional monomers are reacted together to form an $A_1$-L-$B_2$ compound. The "$A_2+B_3$" approach is but one example of a larger category of suitable approaches that may be employed to produce $A_m$-L-$B_n$ compounds useful in forming dendritic polymers. Such compounds can be produced, for example, through polymerization (e.g., in situ polymerization) of $(R^1)A_{m+1}$ and $(R^2)B_{n+1}$ monomers, wherein:
A, B, n, and m are as described above, and
$R^1$ and $R^2$ are independently any suitable atom or group between respective A and B reactive functional groups, including those of L above.

For example, $A_1$-L-$B_2$ compounds in the form of polyacid-polyol reaction products can be formed by reacting either (a) diols and tricarboxylic acids or (b) triols and dicarboxylic acids. Such polyacid-polyol reaction products may be used to generate dendritic polyester polymers. In such processes, suitable steps are preferably taken to avoid gelation. Such steps are described, for example, in the Gao et al. referenced above.

OS groups of the invention can be incorporated into dendritic polymers of the invention using any suitable process. For example, one or more compounds containing OS groups can be reacted with a preformed dendritic polymer to incorporate one or more OS groups into the polymer. Alternatively, one or more compounds containing OS groups can be included in reactants for forming the dendritic polymer.

As discussed above, compositions of the invention preferably include one or more polymers (preferably one or more formable polymers) in addition to the dendritic polymer. The one or more polymers can be any suitable polymer(s) to achieve the desired result, including thermoplastic, non-thermoplastic (e.g., thermosetting), or a mixture of both—although thermoplastic polymers are preferred in some embodiments. Examples of suitable polymers include polyesters such as polyethylene terephthalate ("PET"), polybutylene terephthalate ("PBT"), polyethylene naphthalate ("PEN"), polybutylene naphthalate ("PBN") and other esters of acids and diols that will be familiar to persons having ordinary skill in the art; polylactones such as polycaprolactone; polymethyl methacrylate ("PMMA"); styrene/maleic anhydride ("SMA"); polyoxymethylene ("POM"); ketones such as polyetheretherketone ("PEEK") and polyaryletherketone ("PAEK"); thermoplastic fluoropolymers; polycarbonate ("PC"); polyurethanes; polyarylate ("PAR"); polyphenylene oxide ("PPO"); polyamides such as nylon 6, nylon 6,6, nylon 11, nylon 6,12 and nylon 12; imides such as polyimide ("PI"), polyetherimide ("PEI") and polyamideimide ("PAI");

polyphthalamide; sulfones such as polysulfone ("PSul"); polyarylsulfone ("PAS") and poly ether sulfone ("PES"); polyaminoacids; polydimethylsiloxanes; polyolefins such as polyethylene ("PE"), polypropylene ("PP") and polybutylene ("PB"); styrenes such as polystyrene ("PS"), poly α-methyl styrene and styrene/acrylonitrile ("SAN"); vinyls such as polyvinyl chloride ("PVC") and polyvinylnaphthalene ("PVN"); mixtures thereof; and derivatives thereof which do not unsuitably interfere with oxygen scavenging. In preferred embodiments, the one or more polymers are suitable for contacting food or beverage products.

An optional oxidations catalyst is preferably included in compositions of the present invention. In some embodiments, the oxidation catalyst may enhance the oxygen-scavenging properties of the dendritic polymer by catalyzing an oxygen scavenging reaction with OS groups of the dendritic polymer.

A broad variety of metallic and organic compounds can catalyze the oxygen scavenging effect of certain OS groups, and an appropriate compound may be selected based on any of cost, compatibility with the dendritic polymer, compatibility with other polymers in a blend, and compatibility with other layers in a multi-layered package. Examples of suitable oxidation catalysts include transition metals, complexes of transition metals, photo initiators and the like, and mixtures thereof.

Examples of suitable catalysts include transition metals such as cobalt, iron, nickel, aluminum, ruthenium, rhodium, palladium, antimony, osmium, iridium, platinum, copper, manganese, and zinc, as well as oxides, salts or complexes of these metals, and mixtures thereof. For example, cobalt II salts of short chain acids such as acetic acid or terephthalic acid, or long chain acids such as neodecanoic, stearic, 2-ethyl hexanoic, or octenyl succinic acid may be used. Salts of inorganic acids may also be used. For example, antimony chloride III, antimony chloride V, and cobalt chloride may be used. Preferred catalysts include cobalt salts such as, for example, salts of long chain acids such as cobalt acetate, cobalt neodecanoate, cobalt stearate, cobalt octoate, and mixtures thereof.

Mixed metal nanoparticles may also be suitable as a catalyst. Suitable nanoparticles typically have an average particle size of less than about 200 nm, preferably less than about 100 nm, and more preferably between 5 and 50 nm.

When included, the oxidation catalyst is preferably present in an amount sufficient to catalyze the oxygen scavenging ability of the dendritic polymer. The amount used will typically depend partially upon the catalyst chosen. However, in general, when using transition metal catalysts or complexes, the amount of transition metal catalyst or complexes present may suitably be greater than about 10 ppm by weight, preferably greater than about 100 ppm by weight, and more preferably greater than about 300 ppm by weight of the total composition. The amount of transition metal catalyst or complexes present may suitably be less than about 10,000 ppm by weight, preferably less than about 1,000 ppm by weight, and more preferably less than about 600 ppm by weight of the total composition. In some embodiments, a suitable amount of residual transition metal catalyst or complexes may be present in a polymer material (e.g., PET) that is combined with the dendritic polymer. In general, when using a photoinitiator or blend of photoinitiators, the amount of photoinitiator present may suitably be greater than about 0.01% by weight, and preferably greater than about 0.1% by weight of the total composition. The amount of photoinitiator present may suitably be less than about 10% by weight, and preferably less than about 5% by weight of the total composition.

A wide variety of additional components may be present in the polymer composition of the present invention without detracting from its oxygen-scavenging properties, and this may be particularly important when recycled resins, such as recycled polyesters, are used. Suitable optional additional components or additives include heat stabilizers, antioxidants, colorants, crystallization agents, blowing agents, fillers, accelerants, and the like. Preferably, an anti-oxidant, such as BHT, will be added, as the anti-oxidant enhances the stability of the oxygen-scavenging composition during processing.

The resulting polymer composition can be used in forming articles, may be stored, or may be sent for further processing. Possible further optional processing steps include pelletization and solid stating.

In pelletization, the polymer composition is chopped or ground into small pieces or flakes. Other components may also be added during this process.

Another aspect of the invention is an article including an oxygen-scavenging dendritic polymer or oxygen-scavenging dendritic polymer composition. Articles, including, but not limited to, bottles (including bottle crowns, caps, and other closures); cups; bowls; containers; films; wraps; liners, coatings; trays, cartons; tetrabricks; pouches; and bags for industrial, commercial, or residential use may be formed and produced. The articles may be formed by using the oxygen scavenging-dendritic polymer and/or composition alone, by using a blend of the oxygen-scavenging dendritic polymer and/or composition with one or more other polymers, or by using a multi-layer construction incorporating one or more layers including the oxygen-scavenging dendritic polymer and/or composition. Additionally, the oxygen-scavenging dendritic polymer and/or composition may be used as a coating, as a lining, or as part of a blend for a coating or lining of another article, such as a can, bottle, or container. For example, in some embodiments, the oxygen-scavenging composition may be applied to a substrate such as a metal, plastic, fiberboard, or paperboard substrate.

If desired, the oxygen-scavenging composition may be dissolved in a suitable solvent to form a coating solution, or may be blended with water and/or a suitable solvent to form a coating dispersion. The coating solution or dispersion may be applied using any suitable method including, e.g., spraying the coating solution or dispersion onto a surface of a packaging article and drying the coating form an oxygen-scavenging coating. The coating solution or dispersion may be applied between layers of another suitable polymer to form an oxygen-scavenging film.

Alternatively, the oxygen-scavenging composition may be blended with another compatible polymer to form an oxygen-scavenging article, or may be used as an oxygen-scavenging layer in a multi-layered package construction.

In one embodiment, the invention provides a single-layer article. A single-layer article is an article formed of substantially the same composition throughout. For example, the article may be produced using only the oxygen scavenging composition, or it may be produced using a blend of the composition with one or more other polymers. In general, a single-layer article will suitably include at least about 0.1 weight percent ("wt-%"), more preferably at least about 0.5 wt-%, and even more preferably at least about 1.0 wt-% of the oxygen-scavenging dendritic polymer(s). A single-layer article will typically include less than about 15 wt-%, more preferably less than about 10 wt-%, and even more preferably less than about 6 wt-% of one or more oxygen-scavenging dendritic polymers. The total amount of oxygen-scavenging dendritic polymer included in such articles may be adjusted accordingly if other oxygen-scavenging materials are included.

The oxygen-scavenging composition of the invention may be deployed neat to form a barrier layer of a multilayer packaging article. Or, alternatively, prior to formation of the barrier layer of the multilayer packaging article, it can be blended with one more additional polymers or additives.

Compatible polymers should preferably be selected if a blend is prepared. Preferably, a polymer will be selected that has similar viscosity or similar characteristics (or both) to the oxygen-scavenging dendritic polymer and/or composition. In some embodiments, however, a suitable blend may be formed using a polymer and oxygen-scavenging dendritic polymer having dissimilar viscosities. For example, suitable blends may be produced when a relatively low amount of dendritic polymer having a dissimilar viscosity is included in the blend.

If a blend is used, the blend may be formed at any point, including a preblend compounding step prior to the article production process or, more preferably, during the article production process. The oxygen-scavenging dendritic polymer and/or composition and a compatible polymer may be fed separately into the article production process, and then blended during the process before being formed into the desired article. For example, the separate polymers may be fed into an injection molder, and the components will melt and blend in the screw of the injection molder. Then, the combination will jointly be formed into the produced article. The single-layer article will scavenge oxygen passing through the material, oxygen within the container during filling or storage, as well as oxygen at the outside surface.

For example, a polyester-based dendritic polymer composition may be blended with another polymer having similar viscosities and other properties to enable a high degree of mixing and increase the consistency of the final article. Examples of suitable polyester resins include, but are not limited to, polyethylene terephthalate (PET), polybutylene terephthalate (PBT), polyethylene naphthalate (PEN), and polybutylene naphthalate (PBN). The appropriate polymer will be selected to provide the desired final article properties. Additionally, factors such as blend compatibility, resulting physical characteristics of the blend, and amount of the oxygen-scavenging dendritic polymer composition included in the blend will be considered.

A multilayer product may benefit from placing a layer of another material between the atmosphere and the oxygen-scavenging dendritic polymer and/or composition. An outer layer will usually protect the oxygen-scavenging dendritic polymer and/or composition from physical damage, and also assists in blocking some atmospheric oxygen out. The oxygen-scavenging dendritic polymer and/or composition will preferably scavenge oxygen that penetrates the outer layer, or is present inside the container during filling or storage. Therefore, an additional outside layer may be beneficial in extending the effectiveness of the article, while maintaining other desirable properties.

Any suitable process may be utilized to produce multilayer articles of the invention. For example, co-extrusion or co-injection processes may be employed.

The compatibility of the materials used is sometimes an important consideration for a multilayer article. If the materials are not compatible, the layers may separate or the material may appear cloudy or hazy. Layer separation could lead to failure of the article, decrease clarity even further, degrade the strength or resilience of the article, change the functionality, and might lead to premature exhaustion of the oxygen-scavenging dendritic polymer composition. Appropriate adhesives or other materials may be required for use between layers to maintain article integrity, which may lead to increased costs, manufacturing challenges, and may impact recycling. Therefore, the layers will preferably be compatible if a multilayer article is produced. For example, polymers having similar physical properties such as a viscosity and Tg may be used in conjunction with the oxygen-scavenging dendritic polymer and/or composition.

Appropriate care should preferably be used when handling and storing the oxygen-scavenging dendritic polymer, particularly after the oxidation catalyst has been added to form the oxygen-scavenging composition. Specifically, exposure to oxygen is preferably minimized until use. Therefore, production and storage of the composition under conditions eliminating or minimizing oxygen are preferred. For example, the composition may be stored in well-sealed containers, or under an inert atmosphere such as nitrogen, until use.

Tests of an oxygen-scavenging polymer composition may be conducted by various methods. Oxygen content of a gas sample may be analyzed by the Ocean Optics Foxy Oxygen Sensor System (available from Ocean Optics, Dunedin, Fla.). This system uses fluorescence and quenching to measure oxygen content.

When formed into a monolayer 591 ml carbonated soft drink beverage bottle having an average total wall thickness of about 0.025 cm and tested as described below in Example 6 over a 5-day period, oxygen-scavenging compositions of the invention preferably exhibit less than about 0.5, more preferably less than about 0.05, and even more preferably less than about 0.005 cubic centimeter per package per day ("cc/pkg/day") transmission of $O_2$.

In order to test the viscosity of the oxygen-scavenging polymer, various viscosity tests may be employed. One testing scheme, solution viscosity, is carried out via dissolving an amount of the oxygen-scavenging polymer composition in an appropriate solvent. Another testing scheme is melt viscosity, using a Dynisco or other capillary rheometer may be used. This test is conducted following ASTM D3835-96 "Standard Test Method for Determination of Properties of Polymeric Materials by Means of a Capillary Rheometer." This test is conducted by testing the viscosity of the composition in a liquid form. Preferably, a melt viscosity test will be used, as the viscosity that is important is the viscosity of the material during manufacturing, or the viscosity in the molten state.

EXAMPLES

The invention is further illustrated in the following non-limiting examples, in which all parts and percentages are by weight unless otherwise indicated.

Example 1

Preparation of a Dendritic Polymer Preblend

BOLTORN W3000 FA modified polyol (hereafter "BOLTORN W3000") was provided, whereby substantially all the terminal hydroxyl groups had been esterified with linoleic acid. Per Perstorp product data sheet (dated Dec. 1, 2004), the BOLTORN W3000 material has a molecular weight of 9000 g/mol, and a maximum acid number of 10 mg KOH/g. The material was a hard wax at room temperature (i.e., 25° C.). 0.34 kilograms (kg) of BOLTORN W3000 material were melted by storing in a hot room at 38° C. for 16 hours prior to use. The melted BOLTORN W3000 material was combined with 1.93 kg of Kosa 1101 PET pellets and the resulting mixture was placed in a sealed one-gallon (3.8 liter) can and tumbled for 20 minutes to allow for complete coating of the PET pellets with the BOLTORN W3000 material. The mixture was then fed into a ZSK 25 mm, twin screw, co-rotating extruder to melt mix the resin mixture. The resin blend was extruded at a rate of about 2.2 kg/hour at a temperature of 260° C. Upon exiting the extruder, the blend was cooled in a water bath and pelletized to yield small, uniform pellets.

Example 2

Preparation of a Catalyst Preblend 2.27 kg of Kosa 1101 PET pellets were combined with 0.11 kg of TEN-CEM cobalt catalyst (OMG Industries). The mixture was tumbled in a sealed one-gallon (3.8 liter) can for about 20 minutes to homogenize the blend. The mixture was then fed into a ZSK 25 mm, twin screw, co-rotating extruder to melt mix the mixture. The resin blend was extruded at a rate of about 2.2 kg/hr at a temperature of 260° C. Upon exiting the extruder, the blend was cooled in a water bath and pelletized to yield small, uniform pellets.

Example 3

Preparation of an Oxygen-Scavenging Composition

An oxygen-scavenging composition was prepared by combining 7.5 parts of the dendritic preblend of Example 1, 2.5 parts of the catalyst preblend of Example 2, and 90 parts of Kosa 1101 PET pellets.

Example 4

Preparation of a Packaging Article 28-gram monolayer performs were injection molded from the composition of Example 3. The injection molding was conducted on a Husky injection molding unit at a temperature of about 280° C. The resulting preforms were subsequently blow molded into 20-ounce (591 ml) carbonated soft drink (CSD) bottles having an average sidewall thickness of approximately 0.025 cm. The bottles were stored under nitrogen prior to testing.

Example 5

Preparation of a Packaging Article by Direct Liquid Addition

Approximately 20 pounds (9.1 kilograms) of PET previously dried in a dessicant dryer was sealed in a foil-lined bag and allowed to cool to ambient temperature. The bag was opened, and to the contents of the bag was added 0.7% w/w BOLTORN U3000 and 500 ppm Cobalt in the form of Cobalt Neodecanoate. The bag was then purged with nitrogen, sealed, and the contents were thoroughly mixed. The resulting mixture was fed into the feedthroat of a Husky injection molding unit to produce 28-gram monolayer preforms. These preforms were then blowmolded as described in Example 4.

Example 6

Assessment of Oxygen Transmission

Oxygen transmission rate (OTR) testing was performed on the CSD bottles of Examples 4 and 5 and standard PET (100% Kosa 1101) bottles prepared to the same specification as the bottles of Examples 4 and 5. The bottles were tested using a MOCON oxygen analyzer. Prior to testing, the interior of each bottle was conditioned with water for 24 hours and then blown dry with nitrogen. Once dry, the bottles were adhered to a brass plate and tested for oxygen transmission values (i.e. OTR) values using a Mocon (Modern Oxygen Controls Corporation) Ox-Tran 2/61 oxygen analyzer. Once mounted on the brass plate of the Ox-Tran 2/61 oxygen analyzer, the bottles were purged with 100% nitrogen for 12 hours. After 12 hours, the interior atmosphere of the bottle was analyzed for overall oxygen content, and permeability. The results (average of 3 bottles) obtained for CSD bottles of Examples 4 and 5 were collected and compared to those of the 100% PET control. The results are shown in Table 1 below, with the OTR values reported in cc/pkg/day. The results of Table 1 clearly illustrate that the CSD bottles of Examples 4 and 5 exhibited significantly lower oxygen transmission than the PET control bottles.

TABLE 1

| Composition | Permeability (cc $O_2$/pkg/day) |
| --- | --- |
| Kosa 1101 PET | 0.066055 |
| 1.0% Perstorp W3000 | 0.007599 |
| 0.7% Perstorp U3000 | 0.005712 |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. An article for packaging a food or beverage product, the article comprising:
    one or more layers of a composition comprising:
        a dendritic polymer, which includes an oxygen-scavenging dendritic portion having a degree of branching of at least 0.2, and a plurality of oxygen-scavenging groups located at or near terminal units of the dendritic portion; and
        an oxidation catalyst configured to catalyze an oxygen-scavenging reaction with the oxygen-scavenging groups of the dendritic polymer to reduce oxygen contamination of the packaged food or beverage product.

2. The article of claim 1, wherein the dendritic portion has a degree of branching of at least 0.4.

3. The article of claim 1, wherein the dendritic polymer comprises a polyamide, polyester, polyether, polyolefin, vinylic polymer, polyimine, polysiloxane, polyurethane, polythioether, polyarylalkylenes, polysilane, polycarbonate, polysulfone, polyimide, polyesterimide, polyesteramide, a mixture thereof, or a copoloymer thereof.

4. The article of claim 1, wherein the dendritic polymer comprises a polyester.

5. The article of claim 1, wherein the dendritic polymer comprises at least about 0.5 weight percent of the article.

6. The article of claim 1, wherein the dendritic polymer also includes a non-dendritic portion.

7. The article of claim 1, wherein at least one of the oxygen-scavenging groups is attached to at least one other portion of the dendritic portion by an amide, carbonate, carbonate ester, ester, ether, urea, urethane, a substituted or unsubstituted hydrocarbon linking group, or a combination thereof.

8. The article of claim 1, wherein at least one of the oxygen-scavenging groups comprises an organic group having at least one carbon-carbon double bond, an organic group that is a reaction product of metaxylene diamine, or a mixture thereof.

9. The article of claim 1, wherein the one or more layers comprise a coating disposed on a surface of the article.

10. The article of claim 9, wherein the coating comprises a solution-based coating or a dispersion-based coating.

11. The article of claim 9, wherein the article comprises a bottle, and wherein the surface of the article comprises an inner surface of the bottle.

12. The article of claim 1, wherein the oxidation catalyst comprises a transition metal, a complex of a transition metal, a photoinitiator, or a mixture thereof.

13. The article of claim 1, wherein the dendritic portion has a globular morphology.

14. The article of claim 1, wherein the article comprises a film or a container.

15. The article of claim 1, wherein the composition comprises a thermoplastic composition or a thermosetting composition.

16. An article coating for use in packaging a food or beverage product, the article coating comprising:
   a polymer having a dendritic portion, wherein the dendritic portion has a degree of branching of at least 0.2, and a plurality of oxygen-scavenging groups located at or near terminal units of the dendritic portion; and
   an oxidation catalyst configured to catalyze an oxygen-scavenging reaction with the oxygen-scavenging groups of the polymer to reduce oxygen contamination of the packaged food or beverage product.

17. The article coating of claim 16, wherein the dendritic portion has a degree of branching of at least 0.4.

18. The article coating of claim 16, wherein the polymer also includes a non-dendritic portion.

19. The article coating of claim 16, wherein at least one of the oxygen-scavenging groups is attached to at least one other portion of the dendritic portion by an amide, carbonate, carbonate ester, ester, ether, urea, urethane, a substituted or unsubstituted hydrocarbon linking group, or a combination thereof.

20. The article coating of claim 16, wherein at least one of the oxygen-scavenging groups comprises an organic group having at least one carbon-carbon double bond, an organic group that is a reaction product of metaxylene diamine, or a mixture thereof.

21. The article coating of claim 16, wherein the dendritic portion has a globular morphology.

22. The article coating of claim 16, wherein the article coating comprises a solution-based coating or a dispersion-based coating.

23. The article coating of claim 16, wherein the oxidation catalyst comprises a transition metal, a complex of a transition metal, a photoinitiator, or a mixture thereof.

* * * * *